US008904535B2

(12) United States Patent
Liu et al.

(10) Patent No.: US 8,904,535 B2
(45) Date of Patent: Dec. 2, 2014

(54) PROACTIVE WORM CONTAINMENT (PWC) FOR ENTERPRISE NETWORKS

(75) Inventors: Peng Liu, State College, PA (US); Yoon-Chan Jhi, State College, PA (US); Lunquan Li, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 1753 days.

(21) Appl. No.: 11/961,062

(22) Filed: Dec. 20, 2007

(65) Prior Publication Data

US 2009/0031423 A1 Jan. 29, 2009

Related U.S. Application Data

(60) Provisional application No. 60/871,044, filed on Dec. 20, 2006.

(51) Int. Cl.
*G06F 11/00* (2006.01)
*G06F 12/14* (2006.01)
*G06F 12/16* (2006.01)
*G08B 23/00* (2006.01)
*H04L 29/06* (2006.01)

(52) U.S. Cl.
CPC .......... *H04L 63/145* (2013.01); *H04L 63/1408* (2013.01); *H04L 63/10* (2013.01); *H04L 63/1491* (2013.01)
USPC ........................................................ 726/24

(58) Field of Classification Search
CPC . H04L 63/14; H04L 63/1408; H04L 63/1416; H04L 63/1425; H04L 63/1433; H04L 63/1441; H04L 63/145; G06F 21/56; G06F 21/561
See application file for complete search history.

(56) References Cited

U.S. PATENT DOCUMENTS

2003/0115485 A1* 6/2003 Milliken ........................ 713/201
2006/0021054 A1* 1/2006 Costa et al. ..................... 726/25

FOREIGN PATENT DOCUMENTS

EP 1411703 4/2004

OTHER PUBLICATIONS

Twycross et al., Implementing and testing a virus throttle, Proceeding 12th USENIX Security Symposium, Aug. 4-8, 2003.*
Weaver, N., S. Staniford, V. Paxson. "Very Fast Containment of Scanning Worms." (believed to have been offered for sale, publicly used, and/or published prior to the filing date of this application.).

(Continued)

*Primary Examiner* — Philip Chea
*Assistant Examiner* — Trong Nguyen
(74) *Attorney, Agent, or Firm* — Gifford, Krass, Sprinkle, Anderson & Citkowski, P.C.

(57) ABSTRACT

A proactive worm containment (PWC) solution for enterprises uses a sustained faster-than-normal outgoing connection rate to determine if a host is infected. Two novel white detection techniques are used to reduce false positives, including a vulnerability time window lemma to avoid false initial containment, and a relaxation analysis to uncontain (or unblock) those mistakenly contained (or blocked) hosts, if there are any. The system integrates seamlessly with existing signature-based or filter-based worm scan filtering solutions. Nevertheless, the invention is signature free and does not rely on worm signatures. Nor is it protocol specific, as the approach performs containment consistently over a large range of worm scan rates. It is not sensitive to worm scan rate and, being a network-level approach deployed on a host, the system requires no changes to the host's OS, applications, or hardware.

19 Claims, 7 Drawing Sheets

(56) References Cited

OTHER PUBLICATIONS

Li, Z., M. Sanghi, Y. Chen, M-Y. Kao, B. Chavez. "Hamsa*: Fast Signature Generation for Zero-day Polymorphic Worms with Provable Attack Resilience." (believed to have been offered for sale, publicly used, and/or published prior to the filing date of this application).

Twycross, J. and M.M. Williamson. "Implementing and testing a virus throttle." HP Laboratories Bristol; May 21, 2003.

Abdelhafez, M. et al., "Evaluation of Worm Containment Algorithms and Their Effect on Legitimate Traffic," Proceedings Third IEEE International Workshop on Information Assurance, 2005, pp. 33-42.

Jayanth Kumar Kannan, Lakshminarayanan Subramanian, Ion Stoica, Scott Shenker, Randy Katz, "Cooperative Containment of Fast Scanning Worms," EECS Department, University of California, Berkeley, Technical Report No. UCB/CSD-04-1359, 2004.

Steve R. White et al., "Anatomy of a Commercial-Grade Immune System," Internet Citation XP002310183, IBM Thomas J. Watson Research Center, Yorktown Heights, NY.

Zou, CC et al., "The Monitoring and Early Detection of Internet Worms," IEEE/ACM Transactions on Networking, IEEE/ACM, New York, NY, vol. 13, No. 5, Oct. 1, 2005, pp. 967-974.

Yoon-Chan Jhi, Peng Liu, Lunquan Li, Oijun Gu, Jiwu Jing, Kesidis, George, "PWC: A Proactive Worm Containment Solution for Enterprise Networks," Third International Conference on Security and Privacy in Communications Networks and the Workshops 2007, pp. 433-442.

* cited by examiner (a) Active containment (b) Passive containment (a) $rAC$ at each host. The chart shows values at top three ranked hosts for each $\Delta$.

(b) $rPC$ at each host. For each $\Delta$, the chart shows values at five selected hosts among the top ranked hosts. The $41^{st}$ place is at the border of top 2%.

PROACTIVE WORM CONTAINMENT (PWC) FOR ENTERPRISE NETWORKS

REFERENCE TO RELATED APPLICATION

This patent applications claims priority to U.S. provisional patent application Ser. No. 60/871,044, filed Dec. 20, 2006, the entire content of which is incorporated herein by reference.

GOVERNMENT SPONSORSHIP

This work was supported by the National Science Foundation under Grant No. 335241 and the Department of Homeland Security under Grant No. 425-01, Fund No. 66H20. Accordingly, the U.S. government may have certain rights in this invention.

FIELD OF THE INVENTION

This invention relates generally to the detection and removal of malicious computer code and, in particular, to a signature-free system and method for detecting worm-related scan activity in the form of sustained faster-than-normal connection attempts to distinct destination addresses.

BACKGROUND OF THE INVENTION

Computer worms (i.e., malicious, self-propagating code) are a significant threat to Internet security. Since worm infection can spread more rapidly than human response, automated worm detection and containment techniques are essential. In addition, worm containment techniques need to be able to handle zero-day (unknown) worms.

Although [2] shows that AS-level or ISP-level worm containment could be more effective, almost all the existing worm containment mechanisms are either deployed at the perimeter of an enterprise network (or LAN), or embedded in the hosts within the enterprise, or a combination of both. Enterprise level worm containment has three basic goals: (1) prevent internal hosts from being infected; (2) block outgoing worm scans; (3) minimize the denial-of-service effects caused by worm containment controls.

Recently quite a few approaches have been proposed to do enterprise level worm containment, however, existing defenses are still quite limited in meeting four highly-desired requirements: (R1) timeliness in policing worm scans; (R2) resiliency to containment evading; (R3) minimal denial-of service costs; (R4) being agnostic to worm's scanning strategy to contain a wide spectrum of worms from uniformly randomly scanning worms to topologically aware scanning worms. To see how existing defenses are limited in meeting the four requirements, we break down the existing worm containment defenses into five classes and briefly summarize the limitations in terms of the four requirements as shown in Table I.

TABLE I

Weaknesses of Existing Worm Containment Defenses

| Existing Technique | R1 | R2 | R3 | R4 |
|---|---|---|---|---|
| Virus throttle [1] | | | | X |
| Automated worm fingerprinting [3] | X | X | | |
| Autograph [4] | X | X | | X |
| Polygraph [5] | X | X | | X |
| Hamsa [6] | X | X | | X |
| Fast and automated generation of attack signatures [7] | X | X | | |
| Vigilante [8] | X | X | | X |
| Anomalous payload-based worm detection and signature generation [9] | | X | | |
| Anomalous payload-based network intrusion detection [10] | | X | | |
| Polymorphic worm detection using structural information of executables [11] | | X | | |
| Sigfree [12] | | X | | X |
| Very fast containment of scanning worms [14] | | X | | X |
| Slowing down Internet worms [15] | | | X | |

Class A: Rate limiting. The idea of Class A techniques is to limit the sending rate of scan-like traffic at an infected host. The Virus Throttle proposed by Williamson et al. [1] uses a working set and a delay queue to limit the number of new machines that a host can connect to within unit time. In [15] connection failure rate is exploited, and, in [16], the number of unique IP addresses that a host can scan during each containment cycle is leveraged. Class A techniques may introduce longer delays for normal traffic.

Class B: Signature-based worm scan filtering. The idea is to generate the worm signature which can then be used to prevent scans from entering/leaving a LAN/host. Earlybird [3] is an efficient inline solution that integrates flow classification, signature generation and scan filtering. However, it can be easily evaded by polymorphic worms. Polygraph [5] can handle polymorphic worms, but it spends too much time in generating the signature. In [17], [18], [19], signatures are generated out of packets "captured" by a honeypot. However, network-level flow classification techniques used invariably suffer from false positives leading to noise in the worm traffic pool [6]. Although Hamsa [6] is a fast, noise-tolerant solution against network flows, the false negative and false positive of a signature depend on the accuracy of the flow classifier used. In addition, Hamsa and many other Class B solutions are vulnerable to Polymorphic Blending attacks [20].

Class C: Filter-based worm containment. Class C techniques shares the same spirit with Class B techniques except that a filter is a piece of code which is to check a message if it contains a worm. Shield [21] uses host-based filters to block vulnerabilities but these filters are generated manually. Vigilante [8] generates and distributes host-based filters automatically. But, its response time relies on the worm payload size, and some filters can be evaded by code obfuscation based on char shifting or insertion. To achieve high coverage, they need a complicated detection technique such as dynamic dataflow analysis [22], [23].

Class D: Payload-classification based worm containment. The idea of Class D techniques is to determine if a packet contains a worm. In [9], [10], [24], a set of anomaly detection techniques are proposed to detect worms. But, they suffer from false negatives or false positives, especially in the presence of code obfuscation. In [11] control flow structures are exploited to detect polymorphic worms, but, off-line analysis is required. In [25], [12], they detect if a data packet contains code or not, but, not all worms propagate through data packets.

Class E: Threshold Random Walk (TRW) scan detection. In [13], TRW exploits randomness in picking destinations to connect to, to detect if a host is a scanner. In [14], hardware implementation is investigated. TRW is suitable for deployment in high-speed, low-cost network hardware, and it is very effective in tackling the common way of worm scanning (i.e., random scanning with high failing likelihood).

SUMMARY OF THE INVENTION

This invention resides in a novel, proactive worm containment (PWC) solution for enterprises. The idea of PWC is motivated by two important observations: (O1) If every infected host can be immediately disabled to release user datagram protocol (UDP) packets or get outgoing transmission control protocol (TCP) connections connected, the worm will be contained, even if incoming UDP and TCP connections are still allowed! (O2) In order for a worm to be fast in propagating itself, any infected host must use a sustained faster-than-normal outgoing packet rate.

O1 and O2 indicate that PWC may use a sustained faster-than-normal outgoing connection rate to be-aware that a host is infected and the awareness can be gained many seconds before a signature or filter is generated; then the host's outgoing UDP packets and TCP connection attempts can be instantly blocked—instead of being rate-limited—to achieve quick, proactive containment.

To overcome denial-of-service effect that could be caused by false positives (in identifying infected hosts), PWC develops following two novel white detection techniques: (a) PWC exploits a unique vulnerability time window lemma to avoid false initial containment; (b) PWC uses a relaxation analysis to uncontain (or unblock) those mistakenly contained (or blocked) hosts, if there are any. (Note that PWC is NOT a rate-limiting approach.) Finally, PWC integrates itself seamlessly with existing signature-based or filter-based worm scan filtering solutions. As soon as a signature or filter is generated, PWC may stop enforcing any new containment controls and unblock all still-being-contained hosts.

We have evaluated the cost-effectiveness of PWC using both real world traces and simulation experiments. Our empirical study shows that PWC is significantly outperforming the Virus Throttle scheme proposed by Williamson et al. [1] in terms of all of the three evaluation metrics: (M1) number of released worm scans, (M2) number of hosts infected by local worm scans, (M3) total denial-of-service time per host, especially when the worm scan rate is below 25 scans/sec. Moreover, the experiments show that PWC is significantly outperforming Hamsa [6] in terms of M1 and M2 with negligible denial-of-service costs. The merits of PWC are summarized below.

PWC is signature free; it does not rely on worm signatures. Without the need to match a message (or payload) with a signature or a filter, PWC is immunized from polymorphic worms and all worm code obfuscation methods. Exploiting an unavoidable property of fast worms (i.e., any infected host must use a sustained faster-than-normal outgoing packet rate), PWC is resilient to containment evading.

In terms of timeliness, PWC may react to worm scans many seconds before a signature or filter is generated. By exploiting the vulnerability time window theorem and the white detection idea, PWC causes minimal denial-of-service. PWC is NOT protocol specific, and the solution performs containment consistently over a large range of worm scan rates. PWC is not sensitive to worm scan rate and, being a network-level approach deployed on a host, PWC requires no changes to the host's OS, applications, or hardware.

Although PWC cannot prevent worm scans from entering a host, PWC is in general much more resilient to polymorphic worms and worm code obfuscation than Class B techniques, and PWC has much better timeliness. PWC does not perform code analysis on payloads, and PWC is not vulnerable to attacks such as two-sided evasions [14] which may evade Threshold Random Walk (TRW) scan detection.

DETAILED DESCRIPTION OF THE INVENTION

A. Definitions

Target Worm. We consider UDP/TCP-based scanning worms including bandwidth-limited worms like the Slammer to be the target of PWC. We also take local preferential scanning and hit-list scanning worms into consideration. However, PWC is not designed against slow, stealthy worms that scan, for example, a few destinations per minute.

Worm Scan. For convenience of presentation, worm scans are classified into three types: L-L scans from an internal (local) infectee to an internal address, L-R scans from an internal infectee to an external (remote) address, and R-L scans from an external infectee to an internal address.

Connection Attempts and Successful Connections. In PWC, the containment and the relaxation are mainly triggered by the analysis on outbound TCP SYN and UDP packets. Hereafter, we mean outbound SYN and UDP packets when we mention outbound connection attempts. In addition, we mean outbound SYN-ACK and inbound UDP packets by mentioning successful inbound connections.

B. Architecture

Figure 1A:
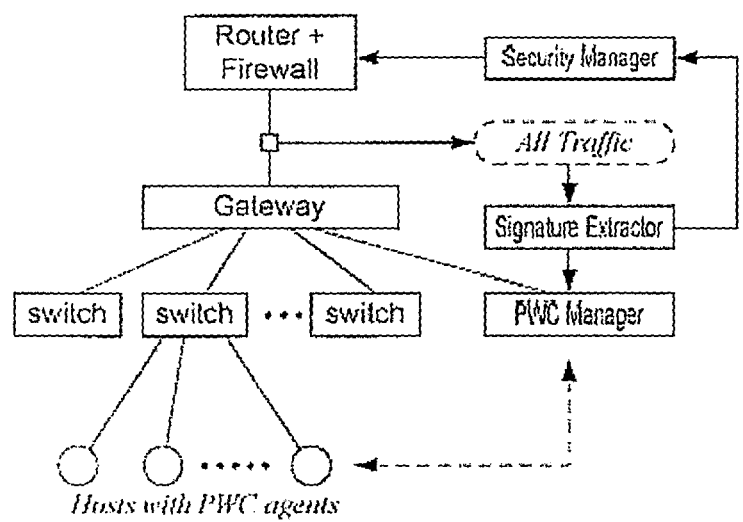
FIG. 1A is a diagram showing PWC deployment in an enterprise network.
Figure 1B:
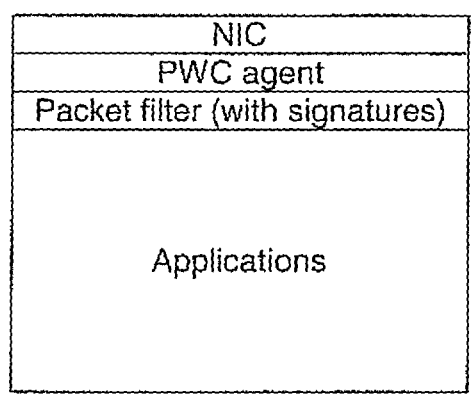
FIG. 1B is a diagram of a host protected by PWC.

PWC system consists of a PWC manager and PWC agents. Each host in the network runs a PWC agent which performs detection and suppression of worm scans going out from its host. A PWC agent can be implemented as; [I1] an OS component such as a kernel driver; [I2] a separated box; [I3] a part of NIC. Our consideration in this paper is limited to I3 only. FIG. 1 shows PWC deployment in an enterprise network and structure of the PWC agents. Before getting into details, we briefly summarize operations of PWC system, from A to G, in an event-driven manner. We will discuss about the details and many other issues on following operations below, following the time line in FIG. 2.

A: When a PWC agent detects a scan activity. The agent takes following actions in order: (A1) The PWC agent raises a smoking sign; (A2) The agent initiates containment on its host, which is called active containment; (A3) The agent reports the smoking sign to the PWC manager; (A4) The agent starts relaxation analysis on its host. A3 is required in order to let other PWC agents be aware of the situation and check their hosts if they are infected. A4 is required since the agent needs to detect sustained faster-than-normal connection attempt to distinct destination addresses, to determine the host is infected.

B: When PWC manager receives a smoking sign. The PWC manager propagates the smoking sign to all other agents except the agent who reported the smoking sign. At current stage, we assume smoking signs are propagated using IP broadcast since our goal in this paper is to show the feasibility of a novel containment technique. The frequency of smoking sign propagation is limited by the system.

C: When a PWC agent receives a smoking sign. The agent takes following actions in order: (C1) examine its own host based on vulnerability window lemma, to see if the host is possibly infected or not; (C2) if no evidence of possible infection is found, the agent ignores the smoking sign; (C3) otherwise, the agent initiates containment on the host, which is called passive containment; (C4) and immediately starts relaxation analysis. C1 and C2 are required to minimize availability loss possibly cased by excessive passive containments.

D: When a PWC agent is performing relaxation analysis. The agent keeps calculating the rate of outbound connection requests initiated during the contained period. This is to check if the host shows sustained fast connection rate to new destinations or not. To minimize availability loss, the duration of relaxation analysis is limited to $t_{relax}$ seconds.

E: When a PWC agent completes relaxation analysis. The agent relaxes or continues on-going containment on its host, depending on the result of relaxation analysis. If the agent relaxes the containment, it will start over above operations from A. If the agent continues the containment (or a relaxation failure), it will repeat D once more. After F relaxation failures, the agent will isolate its host and report to the PWC manager for further handling. We observed no isolated uninfected host through number of experiments with F=30 and $t_{relax}$=1. Please note that, differently from conventional detection techniques, a false positive in white detection means the case in which a detector flags an infected host as uninfected.

F: When signature extractors identify new signatures. The signatures are reported to the PWC manager.

G: When PWC manager receives a signature. The PWC manager sends it to security manager so that it may install the signature into firewalls to block inbound (or outbound) malicious messages. Also, the signature is propagated to all PWC agents so that they may also install it into embedded packet filters. It helps the agents with reducing the rate of smoking signs, preventing known malicious messages from reaching the PWC agents. It also helps reducing unnecessary propagation of smoking signs.

The PWC Approach

PWC consists of three major phases: smoking sign detection (section IV-A), initial containment (section IV-B, IV-C), and relaxation (section IV-D) phases. In this section, we will illustrate each of them in order.

A. Raising Smoking Signs

1) Smoking Signs and Active Containment: Smoking signs require to be raised early, but they are not necessarily required to have an extremely low false-positive rate. This characteristic allows PWC agents to contain earlier while requiring consequent relaxation phases. Since, to survive in the wild, the worm must replicate itself to more than two new victims before being contained, the worm naturally sends infectious messages to as many distinct destination addresses as it can. Therefore, abnormal growth in the number of distinct destination addresses at infected hosts has been reported in many literatures [3], [26], [27]. For fast worms, even a per-second observation shows this attitude of abnormally growing number of distinct destination addresses. We observe that most of the rates of the connection attempts to distinct destination addresses in a 24-hour Auckland-IV trace appear below 15 per second, and only few of them appear between 20 and 25 per second. In our lab computers traces, the rates of distinct destination addresses appear no more than 5 per second. In contrast, even the CodeRed-I can probe more than a hundred destination addresses per second of which the majority are unique addresses.

```
1  // inconhist, outconhist: lists of recent in/outbound
       connection attempts
2  // dsthist: set of known destination IP addresses
3  // srchist: set of known source IP addresses
4  // pkt: a TCP SYN or UDP packet to be sent
5  procedure ON_OUT_CONNECTION(pkt)
6  begin
7      if (host is contained) then
8          ON_OUT_CONNECTION_CONTAIN(pkt) and return ;
9      if (pkt.dst_ip is in {dsthist U srchist}) then
10         Process pkt, and return ;
11     Insert pkt.time to outconhist ;
12     r: = rate of the most recent N elements in outconhist ;
13     if (r > λ) then
14     begin
15         Start active containment ;
16         Report a smoking-sign to PWC manager ;
17     end ;
18 end.
```

Handler ON_OUT_CONNECTION( ) shows how PWC agents handle outbound connection attempts to raise smoking signs and initiate active containment (FIG. 2a). ON_OUT_CONNECTION_CONTAIN( ) in line 8 is to perform Relaxation Analysis when the host is contained. On every connection attempt to a new IP address, a PWC agent calculates the rate r based on the most recent N elements in outconhist, the outbound contact history which is a list of the timestamps of recent outbound connection attempts made to new addresses. If r exceeds the threshold λ, the PWC agent raises a smoking sign, initiates active containment on its host, and reports the smoking sign to the PWC manager.

2) Smoking Sign Propagation: Any smoking sign detected at a host imply the possibility of hidden infectees in the network. To proactively block the hosts that are infected but not detected, the PWC manager shares reported smoking signs with all the agents in the network through the smoking sign propagation. The following message carries the smoking sign reported to the PWC manager: $[t_{sent}+t_d+$the agent's IP]. $t_d$, the detection latency to be used in False Containment Avoidance, is defined as $t_{sent}=t_{in}-t_{sent}$ is the current time and $t_{in}$ is the timestamp of the latest successful inbound connection made before the N timestamps referenced in calculating r. To prevent possible bandwidth saturation caused by worms from interfering with the smoking sign report, the agent reports the smoking sign after containing its host. The receivers of either a reported or a propagated smoking sign would discard the smoking sign if $t_{sent}$ is too old. To prevent forged smoking sign injection, all the messages between PWC agents and the manager should be authenticated using RSA.

To avoid denial-of-service and overwhelming traffic, smoking signs will not be reported to the PWC manager if the time elapsed since the most recently received smoking sign is less than the relaxation analysis duration $t_{relax}$. The PWC manager also applies similar restriction. Therefore, the smoking sign propagation rate is limited to $1/t_{relax}$ times per second.

3) Reducing False Smoking Signs: To reduce false smoking signs caused by excessive small UDP packets to many distinct destinations (e.g., P2P file sharing and mDNS protocols), a PWC agent ignores outbound UDP packets that are shorter than 200 bytes. Please note that the smallest payload length of UDP based worms found in Symantec's Viruses & Risks Search was 376 bytes (SQL Slammer).

B. False-Containment Avoidance

A propagated smoking sign makes every agent in the network start passive containment, which is shown in FIG. 2b. On receiving a propagated smoking sign, the agent validates the smoking sign first, which we named false-containment avoidance. Note that passive containment initiated by the propagated smoking sign is a proactive action taken on a host that is not suspicious from local PWC agent's knowledge. Therefore, any propagated smoking sign can be ignored if the receiving agent ensures that the local host is not infected. A way to do this is the vulnerability window analysis which yields instant decision at each PWC agent on receiving a propagated smoking sign. The decision results in either of SAFE and UNSAFE, where SAFE means the PWC agent can safely ignore the smoking sign, and UNSAFE means the agent should not.

Figure 3:
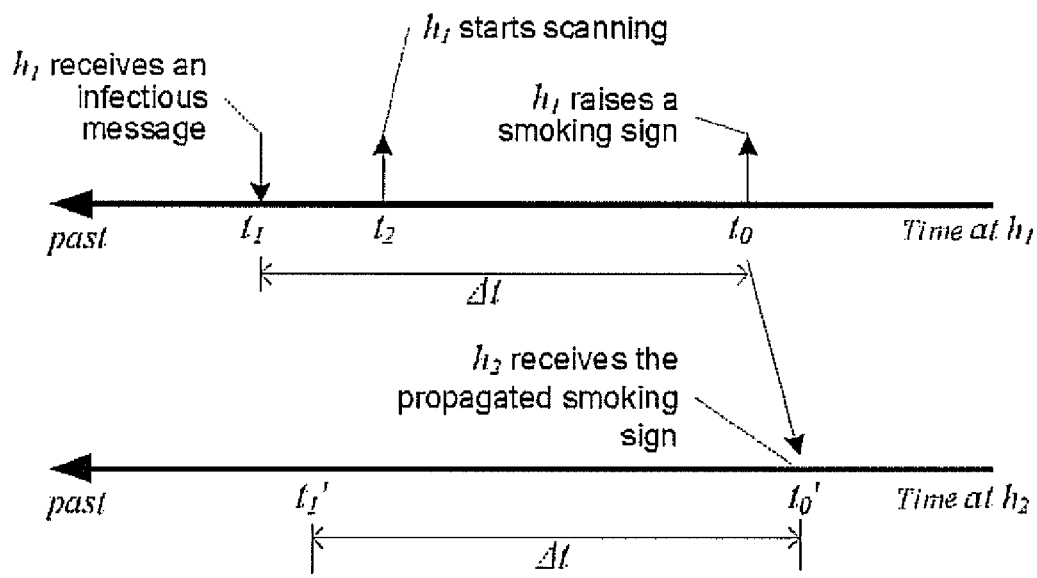
FIG. 3 depicts a vulnerability window.

1) The Vulnerability Window Analysis: Consider PWC is fully deployed in an enterprise network. Let us assume all the PWC agents configured with the same parameters since, typically with many organizations, most hosts within the same enterprise network would have similar ability to send packets. Let us assume that infected host $h_1$ raises and propagates a smoking sign through the PWC manager. Given that $h_2$ is one of recipients of the propagated smoking sign, let us depict the timeline of the propagation in FIG. 3 where, i. $t_1$ at $h_1$ is the time of the last successful inbound connection before releasing the first scan.
ii. $t_2$ at $h_1$ is the time when (potentially) the first scan is released.
iii. $t_0$ at $h_1$ is the time when a smoking sign is raised.
iv. $\Delta t$ is equal to $(t_0-t_1)$
v. $t'_0$ at $h_2$ is the time of receiving smoking sign from $h_1$
vi. $t'_1$ at $h_2$ is equal to $(t'_0-\Delta t)$
vii. $t_{in}$ at $h_2$ is the time of the last successful inbound connection.

Let us assume (a) $h_2$ is susceptible to the same worm as $h_1$ has; (b) $h_2$ is not contained at $t'_0$; (c) $\Delta t < t_{relax}$; (d) $h_1$ and $h_2$ have similar CPU/NIC performance, (a) and (b) are considered to be true, PWC should be configured to hold (c), (d) is generally true in an enterprise network. We do Vulnerability Window Analysis by testing the following hypothesis: (e) the connection attempt made at $t_{in}$ was infectious. The merit of this analysis is that if the hypothesis is proven False, $h_2$ can safely ignore the smoking sign and avoid containing an innocent host. To see if the hypothesis is False, we assume the hypothesis were True, then we prove by contradiction.

To determine whether $h_2$ needs to be contained or not at time $t'_0$, we must consider the following cases (1) and (2).

(1) $t_{in} < t'_1$: If hypothesis (e) were True, $h_2$ should have been infected at $t_{in}$, and PWC agent at $h_2$ must have raised a smoking sign within the time window $[t'_1, t'_0]$ and become contained. From (b), $h_2$ is not contained at $t'_0$, thus we can conclude $h_2$ was not infected at $t_{in}$. Because $h_2$ has never been connected since $t_{in}$, $h_2$ is considered to be SAFE.

(2) $t_{in} > t'_1$: $h_2$ should be considered to be UNSAFE, for we cannot reject hypothesis (e).

Therefore, we have Lemma 1, vulnerability window lemma.

Lemma 1: At $t'_0$, if $h_2$ receives a propagated smoking sign $(t_0, t_d, h_1)$, $h_2$ can ignore the smoking sign and skip passive containment if the following assumptions hold:
i. $t_{in} < t'_0 - t_d$
ii. $h_2$ is susceptible to the same worm as $h_1$ has.
iii. $h_2$ is not contained.

Lemma 1 can be extended to handle multiple lands of worms by taking the larger $t_d$ when smoking signs report different $t_d$'s. Although a worm can evade passive containment by having a delay before starting scanning, the worm cannot successfully spread out since local PWC agent will initiate active containment after monitoring the first N scans.

A limitation of vulnerability window analysis is that any inbound connection attempt within the vulnerability window makes the vulnerability window analysis result in UNSAFE. The result is affected by two factors: first, frequent legitimate inbound connections; second, large vulnerability window $\Delta t$. We will introduce two heuristics to address these limitations and will see how often the vulnerability window analysis would raise false positives with selected $\Delta t$. From the definition of $t_d$ in A-2), the largest $\Delta t$ can be approximated as $N/\lambda$ seconds.

2) Traffic Filter for Vulnerability Window Analysis: To make the vulnerability window analysis resilient to legitimate traffic, we set up two heuristics to sift out meaningful traffic within the vulnerability window. The heuristics are:

H1: Reducing multiple inbound connection attempts made within $H_t$ seconds by the same source IP address. Even an internal worm that scans 8,000 destinations per second with 50 percent of local preference in selecting the destinations would take more than 16 seconds to scan entire /16 local network. Therefore, we regard redundant connection attempts from the same IP address incoming within $H_t$ seconds as a noise, and reduce them leaving only the first one.

H2: Removing inbound UDP packets carrying the payloads shorter than $H_l$ bytes. PWC uses $H_l=200$ as we discussed in A-3).

We could reduce 96 percent of the legitimate inbound connection attempts appeared in our lab PC traces by H1 ($H_t=10$) and H2 ($H_l=200$). In addition, on the same traces, we calculated P[N=0], the probability that vulnerability window at a certain point of time may not include any legitimate inbound connection attempts. Although we do not show the result due to the limited space, P[N=0] when $\Delta t=0.57$ seconds was above 95% and when $\Delta t=1.43$ seconds was above 90 percent.

C. How We Contain a Host

1) Overview on containment: During the period when PWC agents hold containment on their hosts, the hosts are prohibited from initiating connections to other hosts. Once initiated, the containment holds until the end of relaxation analysis that has started along with the containment.

2) Which packets to regulate: During the containment, PWC agents regulate only outbound connection attempts in order to preserve already established sessions. The outbound connection attempts are in three types: (O1) outbound SYN packets; (O2) outbound UDP packets; (O3) inbound SYN-ACK packets. For O1 and O2, a PWC agent modifies the TTL value, moderates the rate, and forwards the packet. This is to integrate PWC seamlessly with other network-based signature identification and filtering techniques, which is discussed below. When the PWC agent forwards the packet with a modified TTL value, it buffers the original packet so that it may forward the packet when the containment is relaxed. The buffered connection attempts will be dropped with appropriate handling if the buffer becomes full or if the packets are delayed for longer than predefined timeout (up to a couple of seconds). For O3, we drop them at each PWC agent under containment. The agent who drops an O3 packet must reply to the sender with a forged RST packet with the sequence number of the dropped packet in order to let the sender (who accepted the connection request) return to LISTEN state.

3) Integrating PWC with other techniques: We designed PWC to work with other network-based signature identification and filtering techniques [3], [4], [5], [6]. During the relaxation phase, PWC agents minimize the affect on other techniques by allowing the packets to be forwarded up to and no further than the signature extractor in FIG. 1a. When a contained host requests an outbound connection attempt, the PWC agent on the host replaces TTL value of corresponding packets with the number of hops to the border of the network. Given the address of border router, the agent can measure exact number of hops to the border router, using the same method as TRACEROUTE [28] does. The signature extractor still see worm scans as if the sources are not contained while the scans from the contained host cannot reach external victims. Potential L-L scans are to be dropped by PWC agents during contained period. To prevent very fast scanning worms from causing congestions on internal paths, the rate of the packets forwarded must be limited to a moderate level.

D. Containment Relaxation Analysis

During the period when a PWC agent is containing its host, it maintains dst, the number of distinct addresses to which the local host has initiated connection attempts, to see if the host shows sustained rate exceeding $\lambda$. We call this analysis relaxation analysis since the goal is to relax contained hosts. Relaxation analysis for a containment initiated at time $t_{contain}$ monitors the host for at least $t_{relax}$ seconds. The connection rate $r_{relax}$ updated at the end of the relaxation analysis is defined as $$\frac{dst}{t_{last\_conn} - t_{contain}},$$

where $t_{last\_conn}$ is the timestamp of the first outbound connection attempt initiated after $t_{contain}+t_{relax}$. The containment should be relaxed if $r_{relax}$ is lower than $\lambda$. Otherwise, the containment should not be relaxed and the relaxation analysis should be performed again. When a PWC agent performs a series of relaxation analyses, $r_{relax}$ is cumulated across consecutive relaxation analyses. By calculating $r_{relax}$ over a series of consecutive relaxation analyses, we can avoid evasion attempts by such worms that periodically scan at a burst rate. F successive failures in relaxing containment will let the host isolated from the network.

1) Effect on Availability: Containment during relaxation analysis may reject legitimate outbound connection requests, which causes availability loss. To find good $t_{relax}$ for an acceptable availability loss, we ran simulations (with no worm) on the busiest four hours of an Auckland-IV trace and calculated length of every containment at every uninfected host participating in the communication.

Let us denote by $\Phi_{i,j}$ the length of the $j^{th}$ containment at host i. $\Phi_i$ is defined to be the sum of all $\Phi_{i,j}$ at a given host i, and $\Phi_k$ is to be $\max(\Phi_{i=k,j})$. $P_i$, the maximum number of relaxation analysis required for host i to be relaxed, is denoted by $$\frac{\Phi_i}{t_{relax}}.$$

Figure 4:
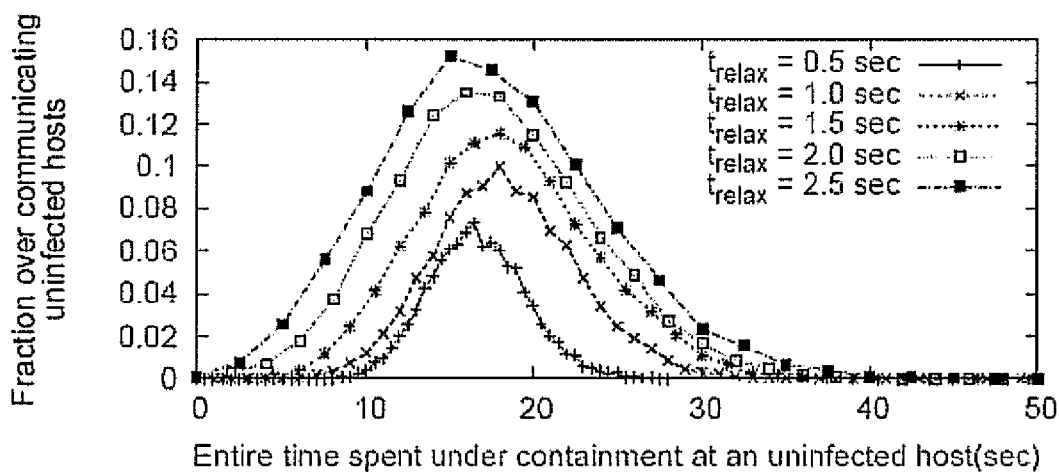
FIG. 4 shows the distribution of $\Phi i$, which implies smaller trelax reduces the total amount of time spent under containment at each uninfected host.

The number written in superscript is the value given for $t_{relax}$. FIG. 4 shows the distribution of $\Phi_i$, which implies smaller $t_{relax}$ reduces the total amount of time spent under containment at each uninfected host. We observed that no more than one phase of the relaxation analysis was required to relax any of the uninfected but (mistakenly) contained hosts. For all the $t_{relax}$'s that we tried, we observed that no outbound connection attempt had been made to a new destination during the contained period. The results empirically show that the relaxation analysis would not bring significant availability loss if $t_{relax}$ is less than a couple of seconds. For the hosts sending out time-critical packets such as Streaming Media packets over UDP, to guarantee acceptable quality of service, we may configure the agents to disable the passive containment.[1]

[1] Please note that the packets transmitted to the same destinations within a certain period are not counted by the smoking sign detector.

2) Stalled-Scan: Another problem is stalled-scan. The scanning of certain TCP-based worms that scan victims in a synchronous manner could be delayed during the relaxation analysis. Blocking outbound SYN and inbound SYN-ACK packets during containment would let the worm wait until TCP retransmission time-out expires, slowing the scan rate down dramatically.[2] Thus, SYN-ACK packets arriving during containment must be translated to appropriately forged RST packets by agents to let the worm immediately close the connection and try the next victim. Since we observed few outbound connection requests were made during containment in simulations based on an enterprise-scale real traces, users would not experience unacceptable connection problems.

[2] However, the synchronous scanning is not suitable for implementing TCP counterpart of very fast scanning worms [29], where proactive response is necessary.

Experimental Setup

Symbols and notations used in following sections are described in Table II. We have evaluated cost-effectiveness of PWC using both real world traces and simulation experiments. We have used following three metrics through out the evaluation:

(M1) number of released worm scan packets.
(M2) number of hosts infected by local worm scans.
(M3) total denial-of-service time per host.

TABLE II

Notations Used in Evaluation

| Symbol | Description |
|---|---|
| $\lambda$ | Smoking sign threshold in the number of unique destinations per second. |
| N | The number of the most recent outbound connection attempts to be used in smoking sign detection |

TABLE II-continued

Notations Used in Evaluation

| Symbol | Description |
|---|---|
| nMI | The number of mistakenly isolated uninfected hosts |
| rAC | The rate of active containments at a host |
| fI | Fraction of infected hosts over entire vulnerable hosts |
| nI | The number of infected hosts in the network |
| nES | The number of escaped scans |
| rS | Worm scan rate |
| rD | Average delay per connection request at a host |
| $\chi$| | The size of $\chi$ |
| WIL-$\chi$-y | Williamson's Virus Throttle with |working set | = $\chi$ and |delay queue| = y. |
| PWC-$\chi$-y | PWC with $\lambda = \chi$ and N = y |

The enterprise network simulations run 13,000 hosts including 50 percent of vulnerable hosts. Local address space for the enterprise network is assumed to be /16, and test worms with different scanning behaviors and different scanning rates are tested in the network. For PWC is a host-based unidirectional worm containment approach, we assume no inbound scans from external infectee. Also, Round-Trip-Time (RTT which is typically less than 1 ms) within the same enterprise network is ignored for brevity.

To determine parameters and to render the normal background traffic, we have used a 24-hour trace of the Auckland-IV traces [30] collected in 2001. Apparently, the traces collected at the border of the University of Auckland do not contain local-to-local traffic at all. However, we assume that the omitted traffic would not affect the experiment results since the observation on our own local traffic showed that (1) H1 and H2 in section IV-B.3 could remove 96% of the legitimate inbound connection attempts; (2) the outbound connection attempts to local addresses implied high locality of the destination addresses; and (3) the burst rate of normal outbound connection attempts did not sustain. In addition, the omitted traffic will also affect existing techniques being compared with our system.

We evaluate PWC against two existing techniques, Williamson's Virus Throttle [1] and the Hamsa [6] in terms of each metric. Since the Virus Throttle generates false positives on seven hosts in the tested background traffic, we set up another configuration (WIL-5-1500) besides the default (WIL-5-100). WIL-5-1500 was the most conservative configuration among those would not raise false positives on the test traffic. For the Hamsa, we deployed it at the border of the enterprise network in the simulator. We assume the Hamsa starts generating signatures when the suspicious pool size reaches 500 and the delay for signature extraction is 6 seconds [6].

Three types of test worms include (T1) randomly uniformly scanning worm, (T2) 0.3 local preferential scanning worm, and (T3) 0.5 local preferential scanning worm. We assumed entire address space to have 232 addresses, and local address space to have 216 addresses. T2 and T3 worms give idea of PWC's effect on the local preferential scanning worms in real world. For example, the CodeRed-II worm scans the same /8 network with 50% probability and scans the same /16 network with 37.5% probability. The Blaster worm picks the target within local /16 network with a probability of 40% and a random IP with 60% probability.

Evaluation

In this section, we first tune two key parameters of PWC. Then we compare PWC with Virus Throttle [1] and Hamsa [6].

A. Tuning: The Smoking Sign Threshold

The sign threshold $\lambda$ and the detection delay N need to be tuned based on the characteristics of normal traffic, and both parameters are critical to the effectiveness of PWC. We tuned PWC using the Auckland-IV traces.

The criterion that we used for a good $\lambda$ is nMI, The Number of Mistakenly Isolated Hosts.[3] To let the smoking signs be raised for the slower worms, $\lambda$ should be small. However, the smaller values for $\lambda$ degrade the accuracy of the smoking signs. To see the correlation between $\lambda$ and the accuracy, we calculated nMI varying $\lambda$ and N, running PWC on a 24-hour long real-traffic trace. Given that N=5 to reduce the effect of the false alarms caused by N, PWC isolated more than 3 naive hosts for the $\lambda$ smaller than 7. When the $\lambda$ was greater than 7, PWC isolated none of the naive hosts, even if the N was set to 2 for the most aggressive configuration.

Figure 2:
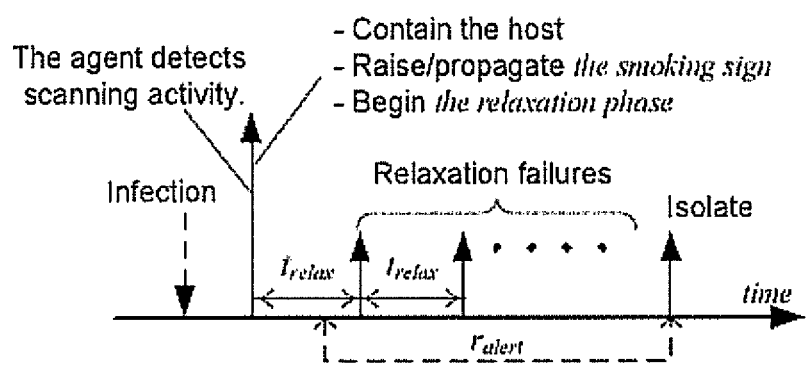
FIG. 2A depicts how PWC agents handle outbound packets to raise smoking signs and initiate active containment.
FIG. 2B depicts an agent receiving the propagated smoking sign and notifying every agent in the net work to initiate passive containment.
Figure 2:
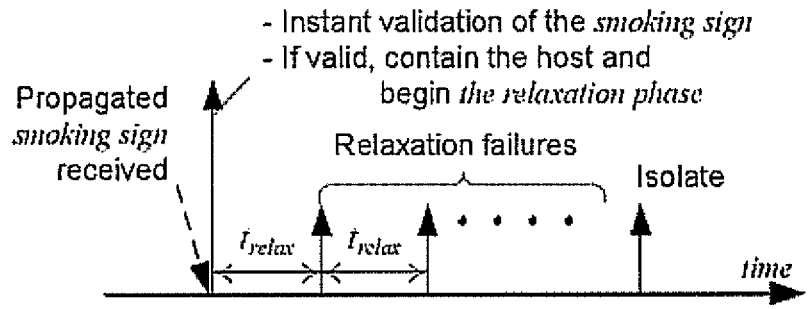

[3] Regarding the isolation, please see FIG. 2.

B. Tuning: Sample Size for the Smoking Sign Detection

Figure 5:
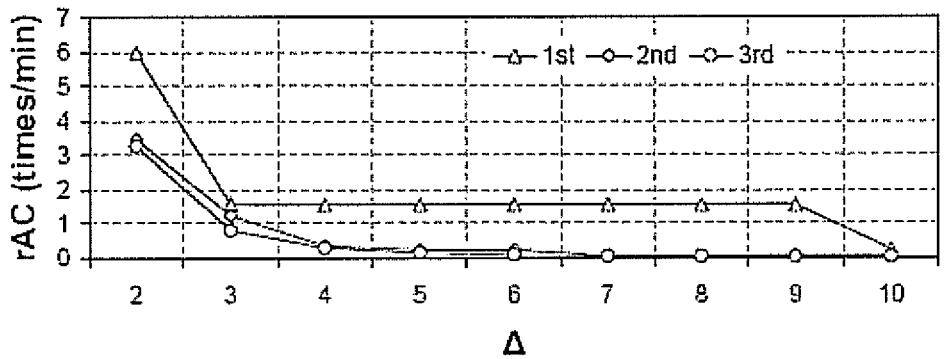
FIG. 5A depicts the values at the hosts ranked within top three in the rate for each N.
FIG. 5B depicts the per-minute failure rates at selected hosts.
Figure 5:
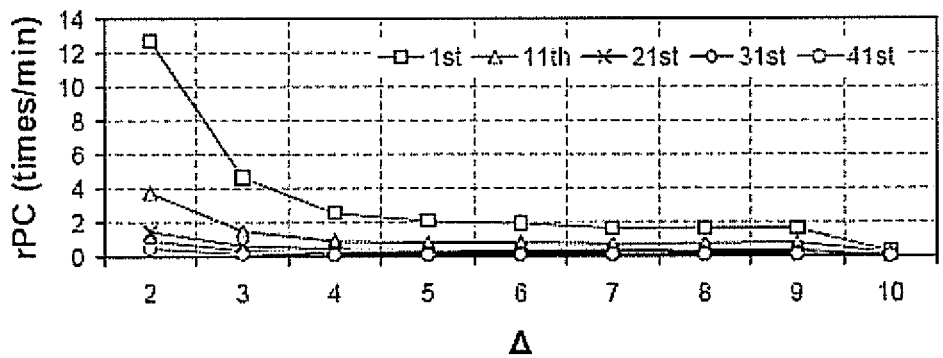

The first criterion for N is the impact on active containments. Repeated active containments resulted by frequent smoking signs will increase availability loss to the hosts. We calculated per-minute rate of active containments caused by false smoking signs at each host, varying TV, running 24-hour long naive traffic. The values at the hosts ranked within top three in the rate for each N are shown in FIG. 5A.

The second criterion is the impact on the passive containments. At each host, a smaller may increase the chance of passive containments, resulting in an increased availability loss. Since the passive containments caused by false smoking signs could be partially solved by the vulnerability window analysis, we calculated the per-host rate of the vulnerability window analysis failures that the vulnerability window analysis mistakenly initiated the passive containment on each naïve host. The per-minute failure rates at selected hosts are shown in FIG. 5B. The curves where N is within the range [4, 8] have shown similar performance. The false smoking signs initiated less than 1 passive containment within 10 minutes for more than 98% of entire hosts when N=4 and the same rate for more than 99% of entire hosts when ¢=10.

Based on the results, we configured N=4 for the more conservative configuration, and N=10 for the less conservative yet more accurate configuration.

C. M1:Local-to-Local Infection Rate

Figure 6:
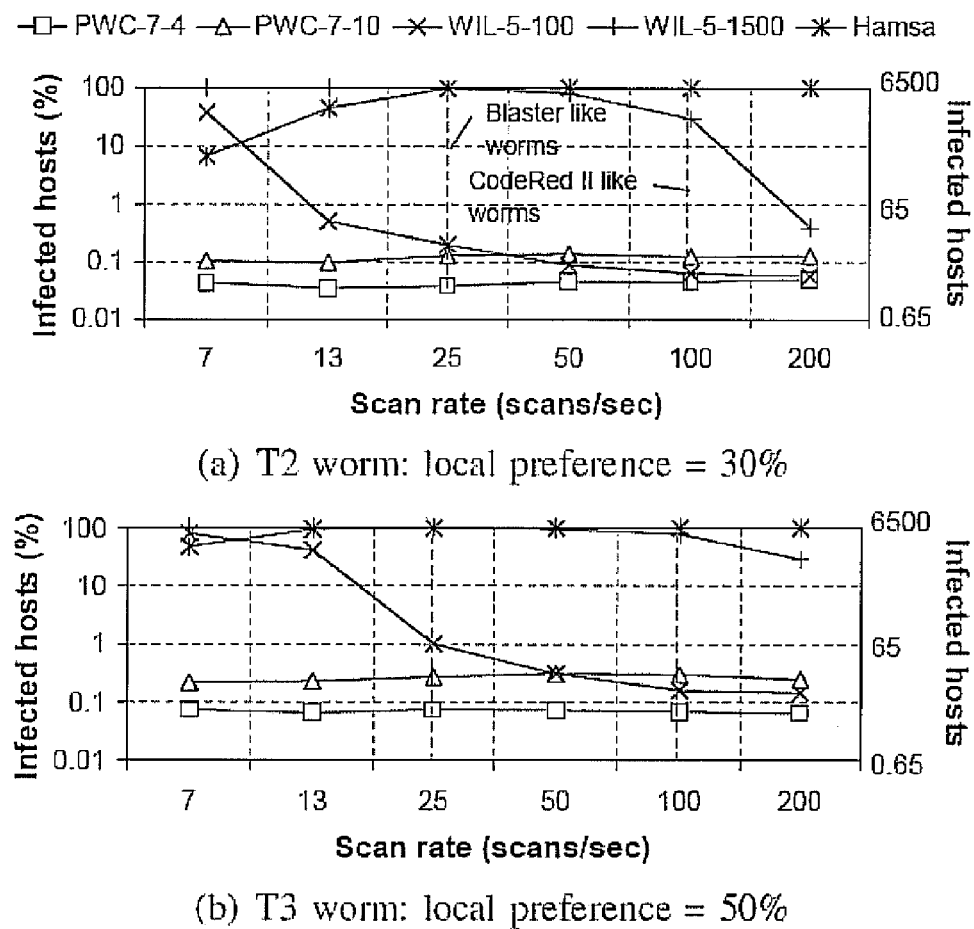
FIG. 6A is a graph showing how PWC successfully suppresses local-to-local infections for T2 worms and that worm scan rate did not affect PWC's performance.
FIG. 6B is a graph showing how PWC successfully suppresses local-to-local infections for T3 worms and that worm scan rate did not affect PWC's performance.

The most significant contribution of PWC is the suppression of the local-to-local worm propagation. We set up 10 hosts initially compromised to stimulate local infection rate. With 10 initially infected hosts, the assumption that 50% of entire hosts are vulnerable to the worm attack could be an extreme case, however, as shown in FIG. 6, PWC successfully suppresses local-to-local infections for T2 and T3 worms. FIG. 6 shows that worm scan rate did not affect PWC's performance.

D. M2:Escaped Worm Scans

Figure 7A:
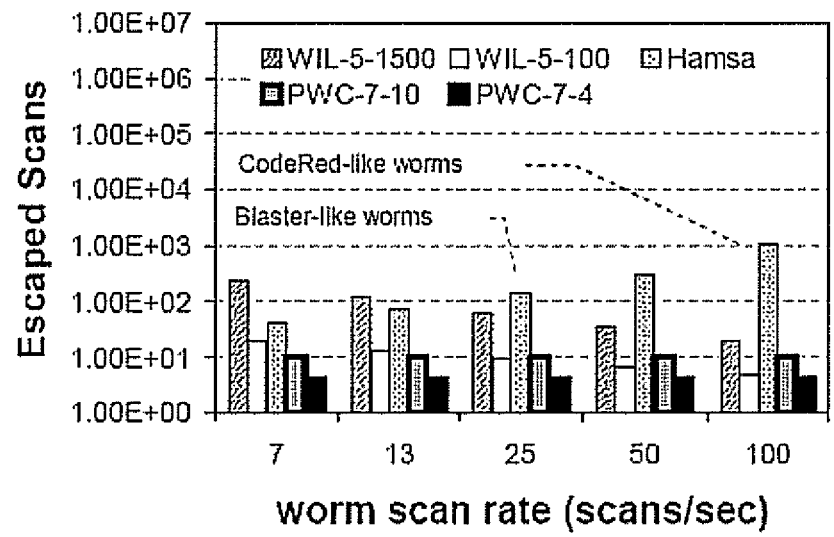
FIG. 7A is a graph showing how PWC outperforms the Virus Throttle and the Hamsa in terms of M2, the number of escaped scans, for T1-type worms.
Figure 7B:
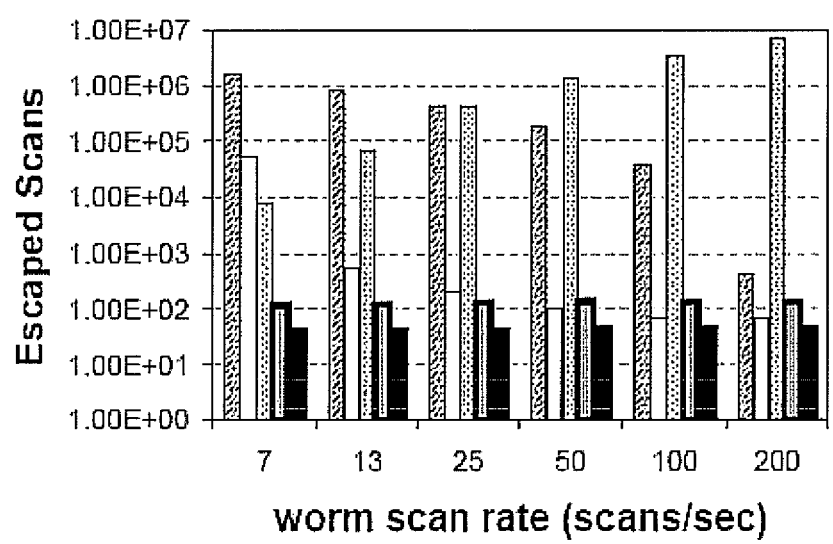
FIG. 7B is a graph showing how PWC outperforms the Virus Throttle and the Hamsa in terms of M2, the number of escaped scans, for T2-type worms.
Figure 7C:
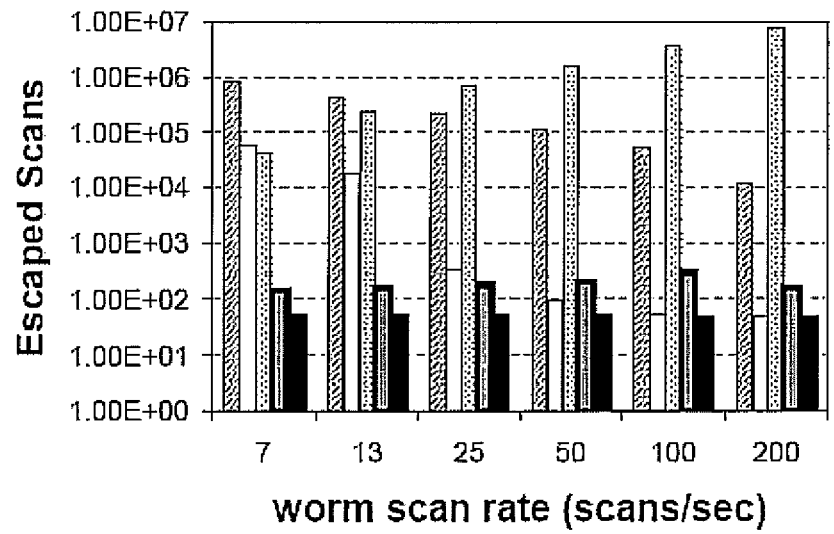
FIG. 7C is a graph showing how PWC outperforms the Virus Throttle and the Hamsa in terms of M2, the number of escaped scans, for T3-type worms.

A successful worm containment strategy must minimize the number of scans that escapes the perimeter of defense during the delay when the containment system detects the enemy and prepares its weapon (i.e., signatures). FIG. 7 shows PWC outperforms the Virus Throttle and the Hamsa in terms of M2, the number of escaped scans. While the Virus Throttle performs better for the faster worms and the Hamsa does for the slower worms, PWC shows consistent performance for all the range of scan rates tested. As the worm scans local address space more aggressively, the performance gap between PWC and other techniques becomes more significant. WIL-5-100 seems to perform better than the generous configuration of PWC (PWC-7-10) for the worms whose scan rates are faster than 25 to 50 scans per second. However, WIL-5-100 isolated 7 hosts due to the false positives. We observed no naive host had been isolated by PWC during the simulations on M2.

E. M3:Total Denial-of-Service Time Per Host

We compared PWC in terms of availability loss that the containments caused by false smoking signs introduced. Please note that, in spite of its longer detection delay, the Hamsa does not introduce the availability loss. Therefore, we evaluated availability loss that PWC introduced, in comparison with the Virus Throttle only.

Figure 8:
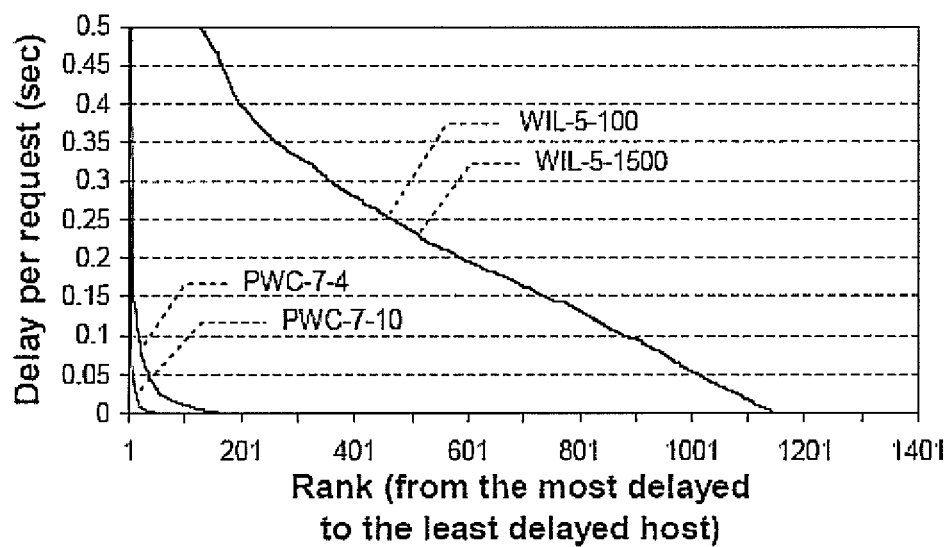
FIG. 8 is a chart showing how PWC significantly outperformed WIL-5-100 and WIL-5-1500 in terms of M3.

To compare PWC and the Virus Throttle fairly based on the same metric, we calculated the average delay per request (rD) running both systems on a 24-hour long naive trace, assuming that the outbound connection requests dropped by the PWC agent at a host would be retransmitted by users when the host would be relaxed. As shown in FIG. 8, PWC significantly outperformed WIL-5-100 and WIL-5-1500 in terms of M3. Due to the long delay queue, WIL-5-100 and WIL-5-1500 delayed outbound connection requests for couples or even tens of seconds in average at several hosts while the maximum rD was 0.95 seconds/request for PWC-7-4 and 0.5 for PWC-7-10. The variations were 0.0016 and 0.0002 for PWC-7-4 and PWC-7-10 respectively.

Discussions

A. Resilience to Counterattacks

Massive emailing viruses and stealthy worms fall outside of PWC's scope. Also, we save authentication and message exchange related issues for future research topics. Some of possible attacks to PWC are discussed below.

1) Attack on the vulnerability window analysis: Wait-and-Scan Attack. After it infects a host, the worm can deliberately have certain amount of delay before sending out the first scan message. Then, by the time when the worm starts scanning victims, the record of the message that infected the host can be removed from the vulnerability window, which makes the worm evade the passive containment when a propagated smoking sign is received. However, it will not harm overall performance of PWC system much since the PWC agent at the host will raise a smoking sign and initiate active containment after first N scans are tested.

2) Attack on the relaxation analysis: Scan-and-Wait Attack. To evade isolation, worms may wait for more than $t_{relax}$ seconds after sending out burst scan messages, before resuming scanning. The Blaster is an example. The Blaster sends out 20 TCP connection requests, sleeps for 1.8 seconds, and then resumes processing with the connections if there are any responses [31]. In this case, although containment and relaxation will be repeated, the scan rate of the worm will be restricted since PWC agent will allow only N out of the 20 scans to escape. When N is 4 and $t_{relax}$ is 1, the scan rate will be limited below 4 scans per second which is much lower rate than $\lambda$ (=7 scans per second) used in our evaluation.

B. Limitations

Being independent to worm's scan rate, PWC can defend against fast and super-fast worms like the Slammer. However, at current stage, it is not suitable solution for slow and stealthy worms scanning below $\lambda$ different destinations per second. The lower bound may change depending on the characteristics of the network to deploy PWC.

C. Applicability

PWC can be applied against worms scanning over $\lambda$ different destinations per second, no matter what scanning strategy and what payload obfuscation technique the worms use. PWC can successfully suppress hit-list worms, flash worms, polymorphic worms, metamorphic worms, etc. that scan more than $\lambda$ victims per second.

Enterprise and smaller networks are PWC's target networks. PWC agents are lightweight so that they can be implemented in either way of hardware or software component. Other worm defense measures can be run in parallel with PWC since they may still see some or large part of malicious messages limitedly forwarded by PWC agents.

REFERENCES

[1] J. Twycross and M. M. Williamson, "Implementing and testing a virus throttle," in *USENIX Security*, August 2003.

[2] D. Moore, C. Shannon, G. M. Voelker, and S. Savage, "Internet quarantine; Requirements for containing self-propagating code," in *INFOCOM*, April 2003.

[3] S. Singh, C. Estan, G. Varghese, and S. Savage, "Automated worm fingerprinting." in *OSDI*, 2004, pp. 45-60.

[4] H.-A. Kim and B. Karp, "Autograph: Toward automated, distributed worm signature detection," in *Proceedings of the 13th Usenix Security Symposium*, August 2004.

[5] J. Newsome, B. Karp, and D. Song, "Polygraph: Automatic signature generation for polymorphic worms," in *IEEE Security and Privacy Symposium*, May 2005.

[6] Z. Li, M. Sanghi, Y. Chen, M. Y. Kao, and B. Chavez, "Hamsa: Fast signature generation for zero-day polymorphic worms with provable attack resilience," in *Proceedings of IEEE Symposium on Security and Privacy*, 2006.

[7] Z. Liang and R. Sekar, "Fast and automated generation of attack signatures: A basis for building self-protecting servers," in *Proc. $12^{th}$ ACM Conference on Computer and Communications Security*, 2005.

[8] M. Costa, J. Crowcroft, M. Castro, A. Rowstron, L. Zhou, L. Zhang, and P. Barham, "Vigilante: End-to-end containment of internet worms," in *SOSP*, 2005.

[9] K. Wang, G. Cretu, and S. J. Stolfo, "Anomalous payload-based worm detection and signature generation," in *Proc. of Recent Advances in Intrusion Detection*, 2005.

[10] K. Wang and S. J. Stolfo, "Anomalous payload-based network intrusion detection," in *Proc. of Recent Advances in Intrusion Detection*, 2004.

[11] C. Kruegel, E. Kirda, D. Mutz, W. Robertson, and G. Vigna, "Polymorphic worm detection using structural information of executables," in *RAID*, 2005.

[12] X. Wang, C. Pan, P. Liu, and S. Zhu, "Sigfree: A signature-free buffer overflow attack blocker," in *Proc. of 15th USENIX Security Symposium*, 2006.

[13] J. Jung, V. Paxson, A. Berger, and H. Balakrishnan, "Fast portscan detection using sequential hypothesis testing," in *Proc. IEEE Symposium on Security and Privacy*, 2004.

[14] N. Weaver, S. Staniford, and V. Paxson, "very fast containment of scanning worms," in *Proceedings of the 13th USENIX Security Symposium*, 2004, pp. 29-44.

[15] S. Chen and Y. Tang, "Slowing down Internet worms," in *ICDCS '04: Proceedings of the 24th International Conference on Distributed Computing Systems (ICDCS'04)*. IEEE Computer Society, 2004, pp. 312-319.

[16] S. Sellke, N. B. Shroff, and S. Bagchi, "Modeling and automated containment of worms," in *IEEE DSN*, 2005.

[17] C. Kreibich and J. Crowcroft, "Honeycomb—creating intrusion detection signatures using honeypots," in *Proc. of the Workshop on Hot Topics in Networks (HotNets)*, 2003.

[18] Y. Tang and S. Chen, "Defending against internet worms: A signature-based approach," in *INFOCOM*, 2005.

[19] V. Yegneswaran, J. Giffin, P. Barford, and S. Jha, "An architecture for generating semantic-aware signatures," in *Proc. 14th USENIX Security Symposium*, 2005.

[20] P. Fogla, M. Sharif, R. Perdisci, O. Kolesnikov, and W. Lee, "Polymorphic blending attacks," in *Proc. 15th USENIX Security Symposium,* 2006.

[21] H. J. Wang, C. Guo, D. R. Simon, and A. Zugenmaier, "Shield: Vulnerability-driven network filters for preventing known vulnerability exploits," in *Proceedings of the ACM SIGCOMM Conference,* August 2004.

[22] J. Newsome and D. Song, "Dynamic taint analysis for automatic detection, analysis, and signature generation of exploits on commodity software," in *NDSS,* 2005.

[23] G. E. Suh, J. Lee, and S. Devadas, "Secure program execution via dynamic information flow tracking," in *ASPLOS XI,* 2004.

[24] M. E. Locasto, K. Wang, A. keromytis, and S. J. Stolfo, "Flips: Hybrid adaptive intrusion prevention," in *Proc. of Recent Advances in Intrusion Detection,* 2005.

[25] R. Chinchani and E. V. D. Berg, "A fast static analysis approach to detect exploit code inside network flows," in *RAID,* 2005.

[26] G. N. P. R. D. D. Uday Savagaonkar, Ravi Sahita, "An os independent heuristics-based worm-containment system," White paper, 2005.

[27] S. Sellke, "Modeling and automated containment of worms," in *DSN '05: Proceedings of the 2005 International Conference on Dependable Systems and Networks (DSN'05).* Washington, D.C., USA: IEEE Computer Society, 2005, pp. 528-537.

[28] G. S. Malkin, "Traceroute using an IP option," RFC1393, January 1993.

[29] S. Staniford, D. Moore, V. Paxson, and N. Weaver, "The top speed of flash worms," in *WORM '04: Proceedings of the 2004 ACM workshop on Rapid malcode.* New York, N.Y., USA: ACM Press, 2004, pp. 33-42.

[30] W. R. Group, "Auckland-iv trace archive," 2002. [Online], Available: http://pma.nlanr.net/Traces/long/auck4.html

[31] S. Institute, "Malware faq: What is W32/Blaster worm?" 2003. [Online]. Available: http://www.sans.org/resources/malwarefaq/w32n_blasterworm.php

We claim:

1. A worm code containment system, comprising:
a computer network including a plurality of interconnected host computers; and
a software agent running on each host, each agent being operative to:
a) detect, during a detection interval, worm-related scan activity or worm code in the form of sustained connection attempts to distinct destination addresses at a rate faster than a predetermined threshold,
b) initiate active containment of a detected worm code,
c) act as an alert-sending host to alert at least one other agent at an alert-receiving host that the worm code has been detected,
d) perform a time-window vulnerability analysis at the alert-receiving host in response to a received alert to determine if suspicious code causing inbound TCP or UDP connections was received during the past X seconds, with X being equal to the alert-sending host's detection interval, and
e) initiate active containment of the suspicious code at the alert-receiving host if the time-window vulnerability analysis cannot prove that the suspicious code is not worm code.

2. The system of claim 1, wherein:
one of the hosts is designated as a manager;
each host further includes a malicious code signature extractor; and
new signatures are reported to the manager.

3. The system of claim 2, wherein:
the manager has access to a security manager; and
when the manager receives a new signature from an agent the manager sends the signature to security manager to install the signature into firewalls to block inbound or outbound malicious code.

4. The system of claim 2, wherein when the manager receives a new signature from an agent, the signature is propagated to all other agents to install the signature into embedded packet filters.

5. The system of claim 1, wherein the agent is implemented as a kernel driver or other operating system (OS) component.

6. The system of claim 1, wherein the agent is implemented as a hardware unit.

7. The system of claim 1, wherein the agent is implemented as part of a network interface controller (NIC).

8. The system of claim 1, wherein containment is effectuated by disabling outgoing user datagram protocol (UDP) packets.

9. The system of claim 1, wherein containment is effectuated by disabling transmission control protocol (TCP) connections.

10. The system of claim 1, wherein each agent is further operative to:
perform a relaxation analysis in response to an alert to determine if the host of the agent also exhibits sustained connection attempts to distinct destination addresses at a rate faster than a predetermined threshold; and
initiate active containment after a predetermined number of relaxation failures.

11. The system of claim 10, wherein the duration of the relaxation analysis is limited in time to minimize availability loss of the host.

12. A method of containing a worm attack in an enterprise network having a plurality of host computers, comprising the steps of:
loading a software agent for execution onto a plurality of host computers forming a computer network, each agent being operative to perform the following functions:
detecting, at one of the hosts during a detection interval, worm code attempting sustained connections to distinct destination addresses at a rate faster than a predetermined threshold and, if detected, initiating active containment of the code at that host;
sending out an alert from the infected host to the other hosts that a worm infection has been detected;
performing a time-window vulnerability analysis at the other hosts to determine if any of the other hosts received suspicious code causing inbound TCP or UDP connections during the past X seconds, with X being equal to the infected host's detection interval; and
initiating active containment of the suspicious code at one or more of the other hosts if the time-window vulnerability analysis performed at a particular host cannot prove that the suspicious code is not worm code.

13. The method of claim 12, wherein:
at least one of the hosts is designated as a manager;
each host further includes a malicious code signature extractor; and
including the step of reporting new signatures to the manager.

14. The method of claim 13, wherein:
the manager has access to a security manager; and
when the manager receives a new signature from an agent the manager sends the signature to security manager to install the signature into firewalls to block inbound or outbound malicious code.

15. The method of claim 13, including the step of propagating the signature to all other agents to install the signature into embedded packet filters.

16. The method of claim 12, including the step of disabling outgoing user datagram protocol (UDP) packets to effectuate containment.

17. The method of claim 12, including the step of disabling transmission control protocol (TCP) connections to effectuate containment.

18. The method of claim 12, wherein each agent is further operative to:
   perform a relaxation analysis in response to an alert to determine if the host of the agent also exhibits sustained connection attempts to distinct destination addresses at a rate faster than a predetermined threshold; and
   initiate active containment after a predetermined number of relaxation failures.

19. The method of claim 18, wherein the duration of the relaxation analysis is limited in time to minimize availability loss of the host of the agent.

\* \* \* \* \*